US012695133B2

(12) United States Patent
Juzkow et al.

(10) Patent No.: US 12,695,133 B2
(45) Date of Patent: Jul. 28, 2026

(54) TEMPERATURE CONTROL MECHANISM FOR BATTERY CELL

(71) Applicant: Joby Aero, Inc., Santa Cruz, CA (US)

(72) Inventors: Marc Juzkow, Livermore, CA (US); Edward Thomas Sweet, Burlingame, CA (US); Austin L. Newman, Castro Valley, CA (US); Pum Sang Cho, San Carlos, CA (US); Ernest Villanueva, San Francisco, CA (US); JoeBen Bevirt, Santa Cruz, CA (US); Luigi Abbate, Redwood City, CA (US); Jon Wagner, Belmont, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 513 days.

(21) Appl. No.: 18/187,167

(22) Filed: Mar. 21, 2023

(65) Prior Publication Data

US 2023/0299382 A1     Sep. 21, 2023

Related U.S. Application Data

(60) Provisional application No. 63/322,052, filed on Mar. 21, 2022, provisional application No. 63/322,040, filed on Mar. 21, 2022.

(51) Int. Cl.
H01M 10/654 (2014.01)
H01M 10/0525 (2010.01)
(Continued)

(52) U.S. Cl.
CPC ..... H01M 10/654 (2015.04); H01M 10/0585 (2013.01); H01M 10/613 (2015.04);
(Continued)

(58) Field of Classification Search
CPC ........... H01M 10/654; H01M 10/0585; H01M 10/613; H01M 10/647; H01M 10/6554;
(Continued)

(56) References Cited

U.S. PATENT DOCUMENTS

| 10,629,915 B2 | 4/2020 | Dawley et al. |
| 11,189,872 B2 | 11/2021 | Drews et al. |

(Continued)

FOREIGN PATENT DOCUMENTS

| JP | 2025510025 | 4/2025 |
| KR | 20090051870 | 5/2009 |

(Continued)

OTHER PUBLICATIONS

"International Application Serial No. PCT US2023 064747, International Search Report mailed Jul. 10, 2023", 5 pgs.

(Continued)

Primary Examiner — Eugenia Wang
(74) Attorney, Agent, or Firm — SCHWEGMAN LUNDBERG & WOESSNER, P.A.

(57) ABSTRACT

A battery cell that includes a plurality of anodes and a plurality of cathodes is provided. The battery cell has a pouch laminate disposed over the plurality of anodes and the plurality of cathodes along with a temperature control mechanism centrally located within the pouch laminate. The temperature control mechanism is disposed between anodes of the plurality of anodes and cathodes of the plurality of cathodes such that the temperature control mechanism is centrally located within battery cell. The temperature control mechanism can regulate a temperature of the battery cell while also regulate an amount of pressure applied to the plurality of anodes and cathodes. The temperature control
(Continued)

mechanism can include passageways through which heat transfer fluid can pass that be used to regulate the temperature and the pressure.

16 Claims, 7 Drawing Sheets

(51) Int. Cl.

| | |
|---|---|
| *H01M 10/0585* | (2010.01) |
| *H01M 10/613* | (2014.01) |
| *H01M 10/63* | (2014.01) |
| *H01M 10/647* | (2014.01) |
| *H01M 10/6554* | (2014.01) |
| *H01M 10/6556* | (2014.01) |
| *H01M 50/105* | (2021.01) |
| *H01M 50/112* | (2021.01) |
| *H01M 50/121* | (2021.01) |
| *H01M 50/124* | (2021.01) |
| *H01M 50/186* | (2021.01) |
| *H01M 50/193* | (2021.01) |
| *H01M 50/204* | (2021.01) |
| *H01M 50/213* | (2021.01) |
| *H01M 50/512* | (2021.01) |
| *H01M 50/531* | (2021.01) |

(52) U.S. Cl.
CPC ..... *H01M 10/647* (2015.04); *H01M 10/6554* (2015.04); *H01M 10/6556* (2015.04); *H01M 50/105* (2021.01); *H01M 50/112* (2021.01); *H01M 50/121* (2021.01); *H01M 50/124* (2021.01); *H01M 50/1243* (2021.01); *H01M 50/186* (2021.01); *H01M 50/193* (2021.01); *H01M 50/512* (2021.01); *H01M 50/531* (2021.01)

(58) Field of Classification Search
CPC ........... H01M 10/6556; H01M 50/105; H01M 50/112; H01M 50/121; H01M 50/124; H01M 50/1243; H01M 50/186; H01M 50/193; H01M 50/512; H01M 50/531; H01M 50/211; Y02E 60/10
See application file for complete search history.

(56) References Cited

U.S. PATENT DOCUMENTS

| | | | | |
|---|---|---|---|---|
| 2003/0180609 A1* | 9/2003 | Yamashita | .......... | H01M 50/186 429/185 |
| 2014/0154401 A1* | 6/2014 | Salot | .................... | G01R 31/396 427/8 |
| 2017/0194606 A1* | 7/2017 | Lim | .................... | H01M 50/578 |
| 2018/0219191 A1 | 8/2018 | Drews et al. | | |
| 2020/0227794 A1* | 7/2020 | Mazza | .............. | H01M 10/6567 |
| 2020/0274208 A1 | 8/2020 | Sucke et al. | | |
| 2021/0184292 A1 | 6/2021 | Park et al. | | |
| 2022/0115711 A1 | 4/2022 | Busacca et al. | | |
| 2023/0299380 A1 | 9/2023 | Juzkow et al. | | |

FOREIGN PATENT DOCUMENTS

| | | |
|---|---|---|
| KR | 20110105945 | 9/2011 |
| KR | 101446149 | 9/2014 |
| KR | 20160080559 | 7/2016 |
| WO | 2023183790 | 9/2023 |

OTHER PUBLICATIONS

"International Application Serial No. PCT US2023 064747, Written Opinion mailed Jul. 10, 2023", 8 pgs.

"International Application Serial No. PCT US2023 064747, International Preliminary Report on Patentability mailed Oct. 3, 2024", 10 pgs.

"European Application Serial No. 23720503.4, Response filed Apr. 24, 2025 to Communication pursuant to Rules 1611 and 162 EP", w claims, 12 pgs.

"U.S. Appl. No. 18/187,168, Non Final Office Action mailed Oct. 14, 2025", 22 pgs.

KR 20090051870 English Translation, 2009, 13 pgs.

"U.S. Appl. No. 18/187,168, Examiner Interview Summary mailed Jan. 9, 2026", 2 pgs.

"U.S. Appl. No. 18/187,168, Response filed Jan. 14, 2026 to Non Final Office Action mailed Oct. 14, 2025", 8 pgs.

"U.S. Appl. No. 18/187,168, Final Office Action mailed Feb. 21, 2026", 25 pgs.

"U.S. Appl. No. 18/187,168, Examiner Interview Summary mailed Apr. 2, 2026", 2 pgs.

"U.S. Appl. No. 18187,168, Final Office Action mailed Feb. 12, 2026", 25 pgs.

"U.S. Appl. No. 18/187,168, Response filed Apr. 13, 2026 to Final Office Action mailed Feb. 12, 2026", 9 pgs.

"U.S. Appl. No. 18/187,168, Notice of Allowance mailed May 27, 2026", 9 pgs.

* cited by examiner

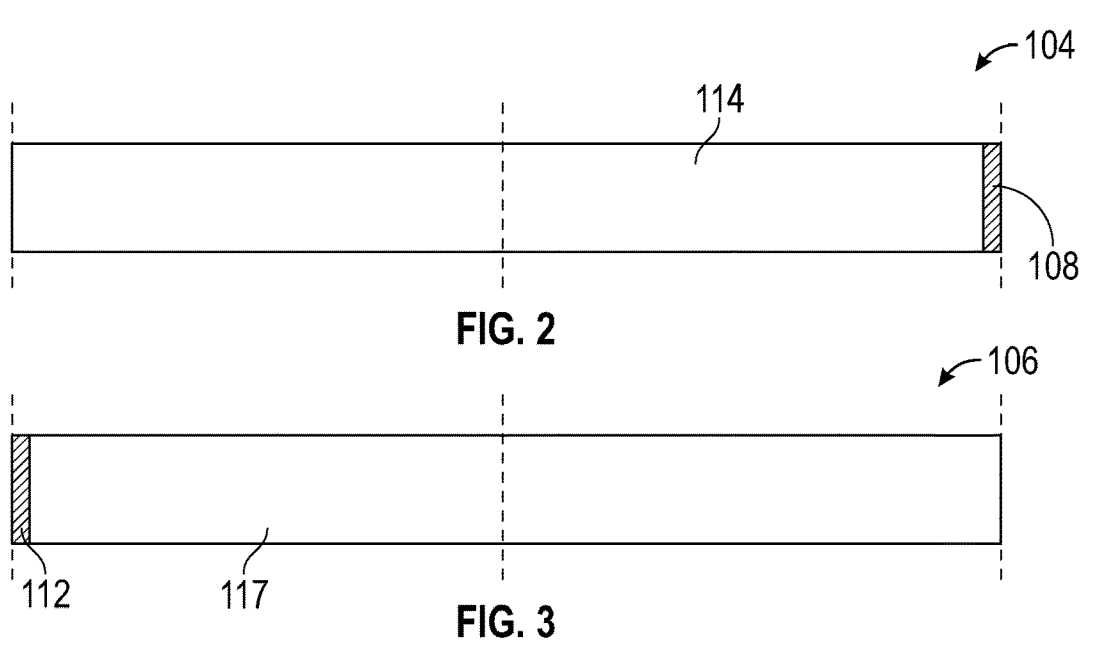
FIG. 2
FIG. 3
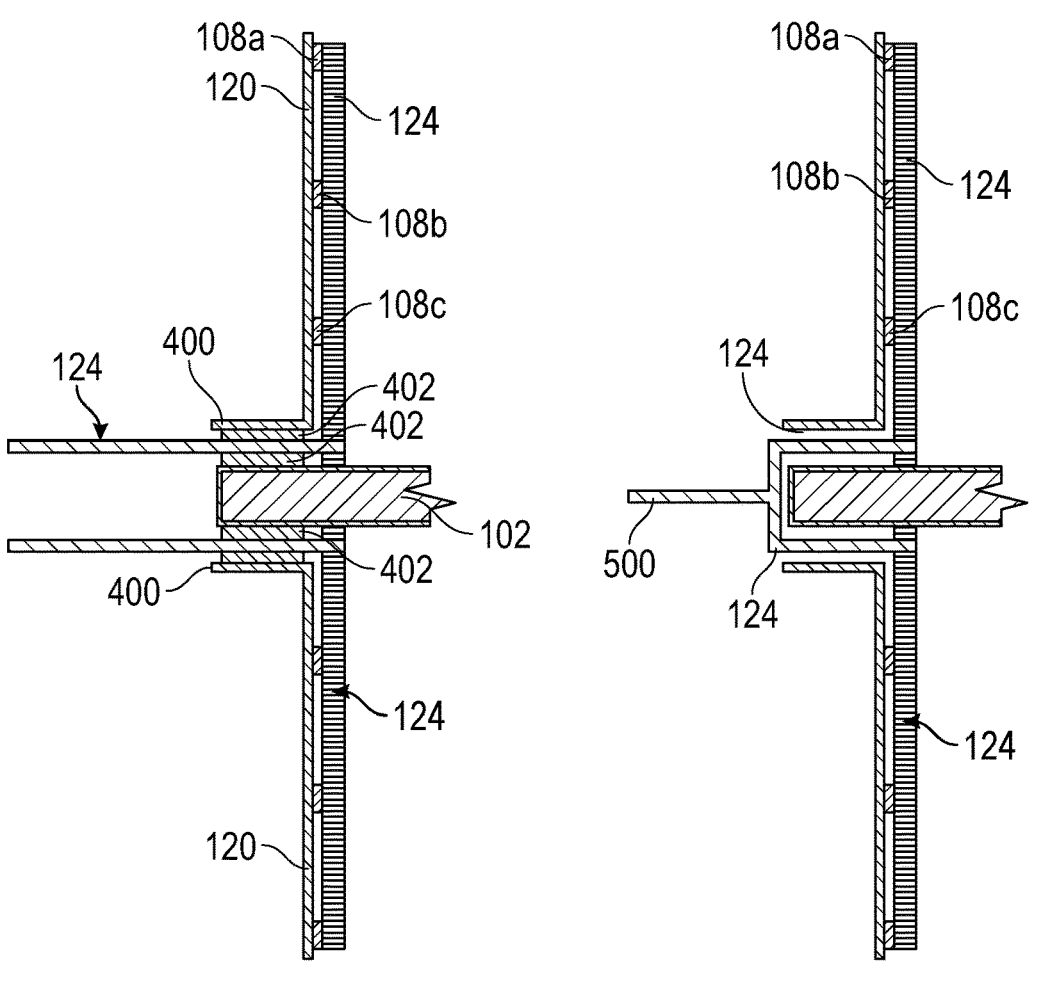
FIG. 4                                        FIG. 5

TEMPERATURE CONTROL MECHANISM FOR BATTERY CELL

CLAIM FOR PRIORITY

The present application claims priority to U.S. Provisional Patent Application Nos. 63/322,040, filed on Mar. 21, 2022, and 63/322,052, filed on Mar. 21, 2022, the contents of which are incorporated herein in their entirety.

TECHNICAL FIELD

Examples of the present disclosure relate generally to battery cells and, more particularly, but not by way of limitation, to a temperature control mechanism that can be used with battery cells.

BACKGROUND

Typically, rechargeable batteries are for loads having high energy requirements. Examples can include vehicles such as automobiles and aeronautical vehicles. During recharging, a temperature of the battery can be increased in order to decrease impedance to improve fast charging. Moreover, during use, such as flight in aeronautical applications, the temperature of the battery naturally increases. However, the increased temperature of the battery over time can decrease the lifespan of the battery. Thus, the battery should be cooled in order to increase the lifespan of the battery.

BRIEF DESCRIPTION OF THE DRAWINGS

Various ones of the appended drawings merely illustrate example embodiments of the present disclosure and should not be considered as limiting its scope.

FIGS. 2 and 3 illustrate the formation of anodes and cathodes for the battery cell of FIG. 1, according to some examples.

FIGS. 4 and 5 illustrate the formation of a top seal with external electrical tabs, according to some examples.

DETAILED DESCRIPTION

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Examples relate to a temperature control mechanism for a battery cell. The temperature control mechanism can function to control the temperature of the battery cell by increasing and decreasing the temperature of the battery cell. The temperature control mechanism can be solid or hollow, such as a cold plate, and located in a center of a battery cell. When the temperature control mechanism is located in the center of the battery cell, a solid battery cell can be formed that is stiffer and less floppy in comparison to a battery cell that does not include the temperature control mechanism. The temperature control mechanism can be assembled with a beveled design to aid in providing stack pressure. In addition, the temperature control mechanism can expand when pressurized with an internal heat transfer fluid. Both of these designs can aid in creating pressure on one side of an electrode stack formed in the battery cell, where the battery cell can include a pouch laminate that is disposed on an opposite side end plate.

The battery cell can include lithium-ion, lithium metal, or a similar rechargeable battery chemistry. Regardless of the chemistry, the battery can use an aluminum foil-polymer laminate for containment. Moreover, the battery cells can allow for flexible packaging. Examples can relate to integrating the temperature control mechanism into the battery cell. The battery cell can be disposed within a pouch formed of several layers. The battery cell can include either a single cell having anodes and cathodes or multiple cells having anodes and cathodes. The temperature control mechanism can be inserted into the middle of the battery cell. Accordingly, by virtue of the temperature control mechanism being centrally located within the battery cell, the temperature control mechanism can more evenly regulate a temperature of the battery cell. Furthermore, the temperature control mechanism can function to decrease a temperature of the battery cell.

Figure 1:
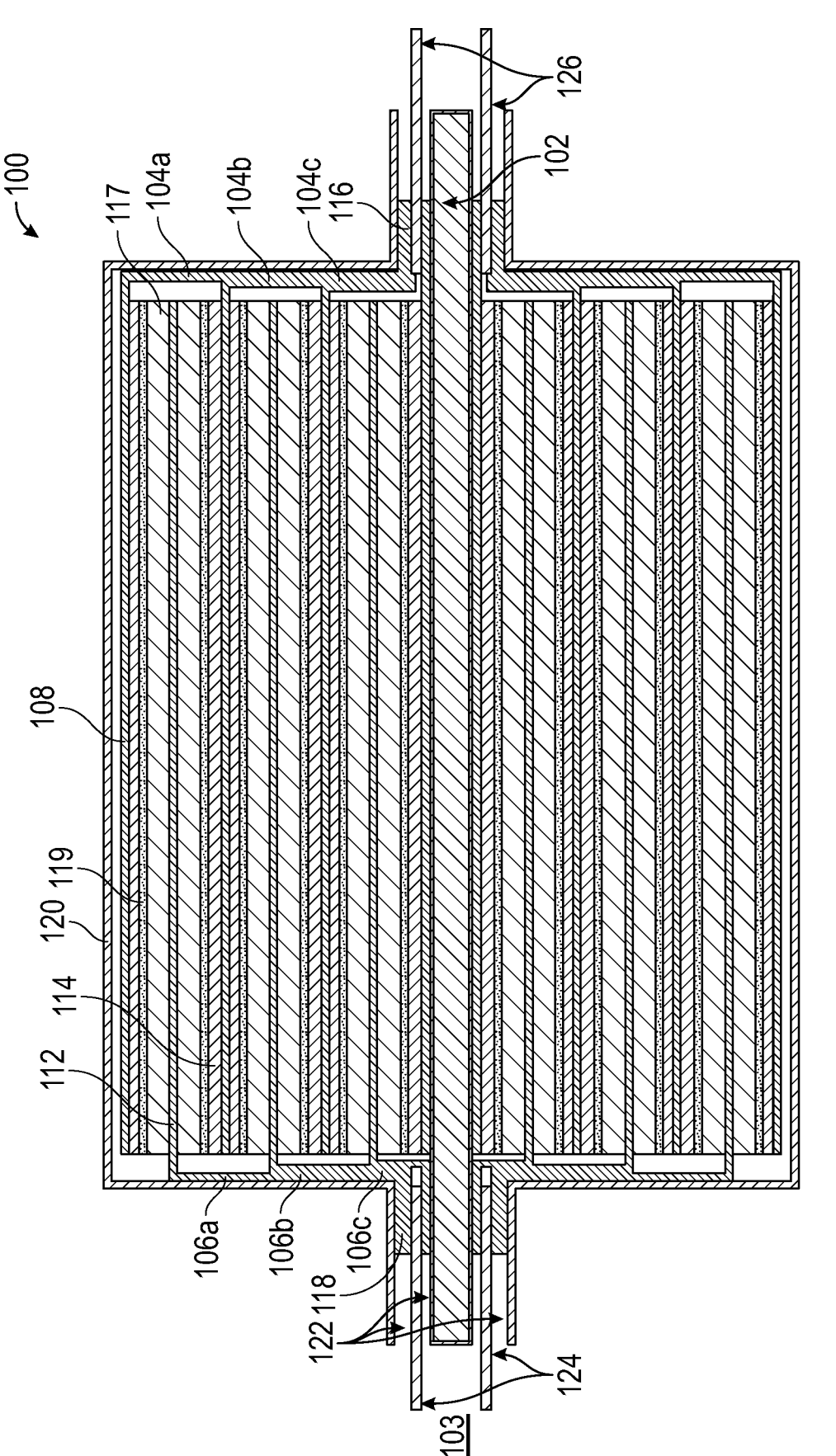
FIG. 1 illustrates a battery cell, according to some examples.

Now making reference to FIG. 1, a battery cell 100 that includes a temperature control mechanism 102 in shown, in accordance with examples. The battery cell 100 can be a lithium liquid system. As may be seen with reference to FIG. 1, the temperature control mechanism 102 can be formed in a central location 103 of the battery cell 100. By virtue of the central location 103 within the battery cell 100, the temperature control mechanism 102 can provide the advantages discussed above.

The battery cell 100 can include anodes 104 along with cathodes 106 that can function to generate an electrical current to power an external load. In examples, an anode 104 (also shown in FIG. 2) can include a current collecting portion 108 along with an active area 114, which can be formed as a coating on the current collecting portion 108. As can be seen with reference to FIG. 2, the anode 104 can be defined by the collecting portion 108 where the active area 114 can be formed on the current collecting portion 108. A liquid slurry that comprises the active area 114 can be deposited onto the current collecting portion 108 where the resultant structure is subjected to a drying process. The current collecting portion 108 can be formed of any type of conductive material, such as copper, nickel or the like.

Moreover, the active area 114 can be formed of any type of anode material that has high energy density, high power density, and a long cycle life. Examples can include graphite, a combination of graphite and Si/C, Si or Si, or the like. The anode 104 can also be a sheet of lithium metal, where the metal foil acts as both the active material and the current collector (not shown) or lithium metal plated onto a current collector.

The cathode 106 can include a current collector portion 112 along with an active area 117, which can be formed as a coating on the current collecting portion 112, as more clearly shown with reference to FIG. 3. Similar to the anode 104, the cathode 106 can be defined by the current collecting portions 112 where the active area 117 can be formed on the current collecting portion 112. A liquid slurry that has the active area 117 can be deposited onto the current collecting portion 112 where the resultant structure is subjected to a drying process. The current collector portion 112 can be formed of any type of conductive material, such as aluminum, or the like. The current collector portion 112 can also be formed of copper, nickel, cobalt, manganese, or the like. Additionally, the active area 117 can be formed of any type of cathode material that has high energy density, high power density, and a long cycle life.

Returning attention to FIG. 1, each of the current collectors from the anodes 108a-c can be fused together, shown as 116. Similarly, each of the current collectors from cathodes 112a-c can be fused together, shown as 118. The anodes 104a-c and the cathodes 106a-c can be fused using a welding technique. Moreover, by virtue of forming the collection of anode current collectors 116 and cathode current collectors 118, parallel electrodes can be formed. In addition, the battery cell 100 can include a cathode/catholyte layer 117 and a solid-state electrolyte layer 119. The solid-state electrolyte layer 119 can function as a separator between the cathode/catholyte layer 117 and the anode 104. The structure of the cathode/catholyte layer 117 and the solid-state electrolyte layer 119 can repeat throughout the battery cell where the pattern repeats such that each repeating layer is a mirror image of the previous layer.

The design of the battery cell 100 shown with reference to FIG. 1 can work with a pouch laminate 120. The pouch laminate 120 can include multiple layers, such as a layer of aluminum, a layer of nylon, a Polyethylene terephthalate (PET) layer, and a sealant layer of co-polymer polypropylene and polyethylene (CPP), polypropylene, polypropylene/polyphthalamide or the like formed on an inside surface of the pouch laminate 120. The pouch laminate 120 can be formed into a cup in order to fit over the electrode stack. The pouch laminate 120 can seal directly with the temperature control mechanism 102 via the sealant layer on all sides of the pouch laminate 120. Moreover, the temperature control mechanism 102 can be centrally located within the pouch laminate 120, as shown with reference to FIG. 1.

Making reference to FIG. 4, the pouch laminate 120 can be heat sealed over external tabs 124 at a shelf 400 where portions of the pouch laminate 120 form a shelf during a cup formation process. The shelf 400 can be on both sides of the external tabs 124, as shown with reference to FIG. 4. The temperature control mechanism 102 also has a sealant layer 402 which is heat fused to the underside of the external tabs 124. The external tabs 124 can extend from the battery cell 100 where the sealant layer 402 can be disposed around the external tabs 124. The external tabs 124 can be formed from any conductive material, such as nickel, nickel plated copper, aluminum or the like, and can function as an electrical lead extending from the battery cell 100. Thus, in examples, a load can couple with the battery cell 100 via the external tabs 124. In examples, a first layer of sealant can be disposed on an inner surface of the pouch laminate 120, a second layer of sealant can be disposed about both sides of the tabs 124, and a third layer of sealant can be disposed about the temperature control mechanism 102.

Each of the sealant layers can be heat fused such that the shelves 400 are in the position shown with reference to FIG. 4. Thus, the temperature control mechanism 102, the external tabs 124, and the shelf 400 of the pouch laminate 120 are sealed with each other via the sealant layers thereby forming a near hermetic seal.

In some examples, such as configurations where one battery cell 100 couples with another battery cell 100 instead of directly to a load, the external tabs 124 can be fused into a single tab 500, as shown with reference to FIG. 5. In this example, the tab 500 can be configured to couple with another battery cell 100 instead of to a load.

Furthermore, in the example shown with reference to FIGS. 4 and 5, the battery cell 100 can include internal metal bus bars 404 (now 108). As described with reference to FIG. 1, each of the anodes 104a-104c (now 108a-108c) are fused to each other. In the example shown with reference to FIG. 4, instead of fusing the anodes 104a-104c (now 108a-108c) to each other to form the collection of anode current collectors 116, the anodes 104a-104c (now 108a-108c) are fused to the external metal bus bars 124. While not shown, the cathodes 106a-106c could also be fused to external metal bus bar 126 similar to the external metal bus bars 124.

As noted above, the temperature control mechanism 102 can include a layer of CPP disposed thereabout. Now making reference to FIGS. 6A-6D, the temperature control mechanism 102 can include sealant layer 600 disposed only about sides 602-608 of the temperature control mechanism 102. In particular, the sealant layer 600 is not disposed about a top surface 610 of the temperature control mechanism 102 nor a bottom surface 612 of the temperature control mechanism 102. However, in some examples, the sealant layer 600 can be disposed on the temperature control mechanism top surface 610 or on the temperature control mechanism bottom surface 612. Additionally, in some examples, the sealant layer 600 can be disposed on the temperature control mechanism top surface 610 and on the temperature control mechanism bottom surface 612. In examples, the sealant layer 600 can be melted onto the temperature control mechanism 102. Regardless of the positioning of the sealant layer 600 on the temperature control mechanism 102, the sealant layer 600 can be heat sealed with the sealant layer of the pouch laminate 120 to form a hermetic seal. The sealant layer 600 can be formed from CPP or a combination of polypropylene and Polyphthalamide.

Figures 6A, 6B, 6C, 6D:
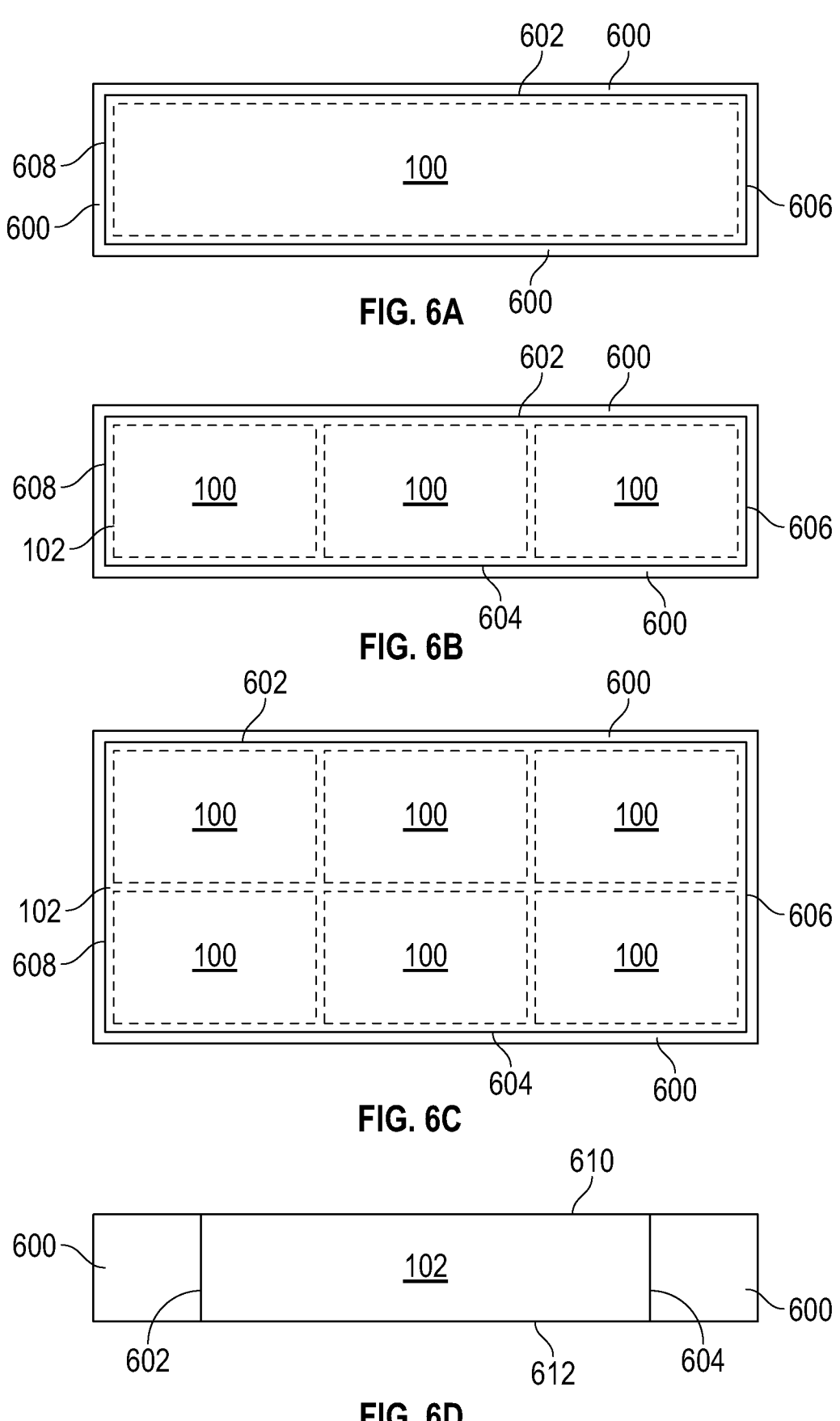
FIGS. 6A-6D illustrate a temperature control mechanism with dashed lines to outline an outer perimeter of an electrode stack such as that shown with reference to FIG. 1 onto a temperature control mechanism, according to some examples.

Moreover, as shown in FIGS. 6B and 6C, multiple battery cells 100 can be disposed on a single temperature control mechanism 102. For example, as shown in FIG. 6B, three battery cells 100 are disposed on the temperature control mechanism 102. In FIG. 6C, six battery cells 100 are disposed on the temperature control mechanism 102. While three and six battery cells 100 are shown disposed on a single temperature control mechanism 102, examples envision that any number of battery cells can be disposed on a single temperature control mechanism 102.

Figure 7A:
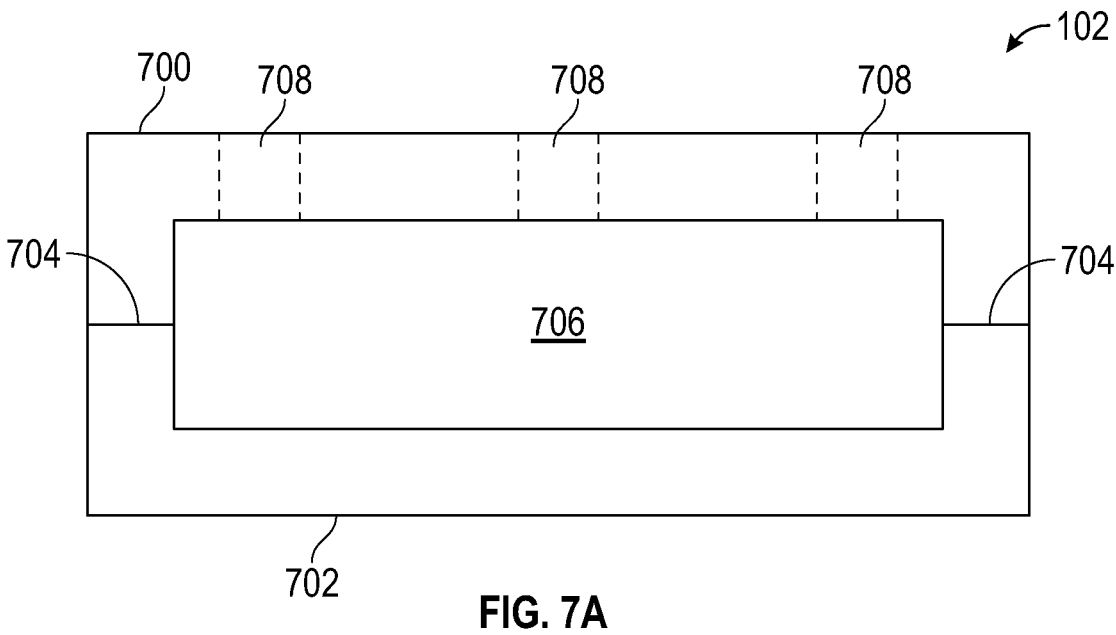
FIGS. 7A and 7B illustrate a temperature control mechanism for the battery cell of FIG. 1, according to some examples.
Figure 7B:
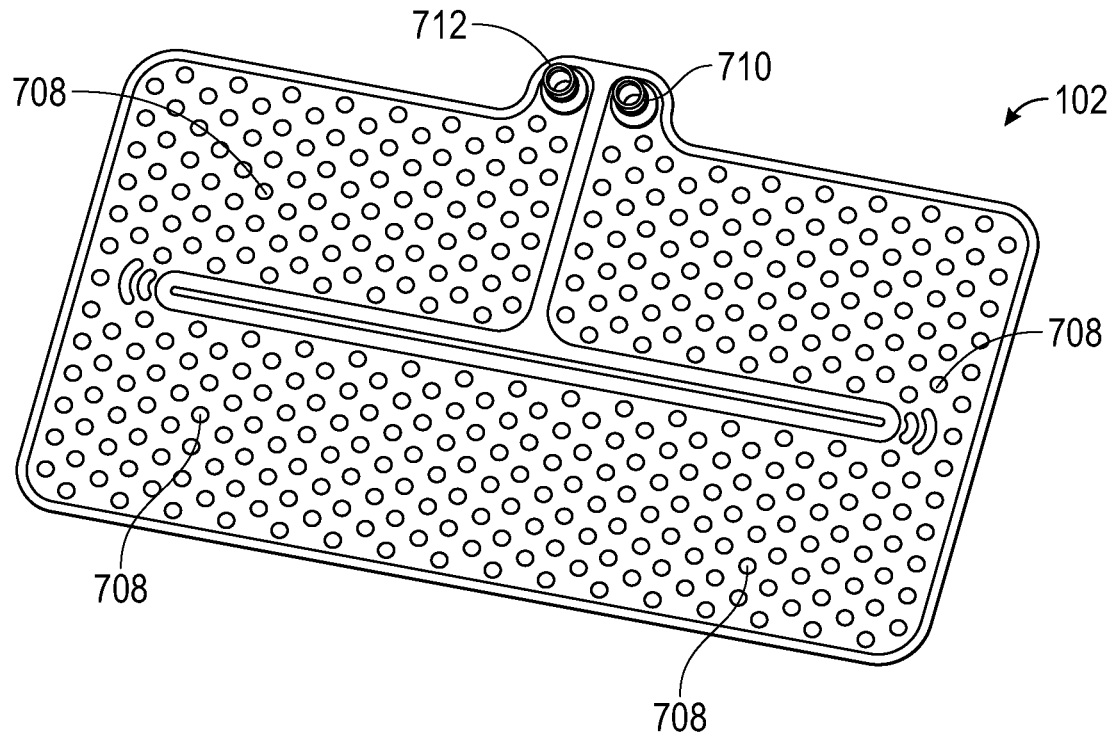

Now making reference to FIGS. 7A and 7B, the temperature control mechanism 102 can be configured to have a heat transfer fluid travel therethrough. More specifically, the temperature control mechanism 102 can include two hollow metal plates 700 and 702 welded to each other at edges 704 of the hollow metal plates 700 and 702. When the two hollow metal plates 700 and 702 are welded to each other, a sealed hollow cavity 706 can be formed between the hollow metal plates 700 and 702 where passageways 708 are disposed therein through which a heat transfer fluid can travel. The hollow metal plates 700 and 702 can be formed of metal in order to optimize thermal flow or a polymer. Example metals can include stainless steel, aluminum, titanium or the like. Example polymers can include polyolefins such as Polypropylene or HDPE, and PPS, PET, PEEK, polyimide, POM, PVC, PTFE, polyurethane, FEP, rubber or the like.

The heat transfer fluid can be provided to the temperature control mechanism 102 from an external source (not shown) via an inlet 710 that is fluidly coupled with the passageways 708. The external source can modulate the temperature of the heat transfer fluid provided to the temperature control mechanism 102 based on the temperature needs of the battery cell 100. Thus, the temperature control mechanism 102 can be used to modulate a temperature of the battery cell 100. In examples, the external source can also include a heat exchanger such that, in examples where the heat transfer fluid is drawing heat from the battery cell 100, i.e., cooling the battery cell 100, the heat exchanger can function to extract heat from the heat transfer fluid when the heat transfer fluid exits the temperature control mechanism 102 and the passageways 708 via an outlet 712 that is fluidly coupled with the passageways 708. The heat transfer fluid can be repeatedly used to extract heat from the battery cell 100. Thus, the temperature control mechanism 102 can be used to decrease the temperature of the battery cell 100, such as prior to a mode where an output of the battery cell 100 is being provided to a load, i.e., during takeoff of an aeronautical vehicle.

In addition to cooling, as noted above, the temperature control mechanism can be used to add heat to the battery cell 100. To further illustrate, if a temperature of the battery cell 100 needs to be increased, such as during a charging process, a temperature of the heat transfer fluid can be increased via the external source and the heat exchanger and then provided to the temperature control mechanism 102. As such, the heat transfer fluid, via the temperature control mechanism 102, can work to increase the temperature of the battery cell 100.

Figure 8:
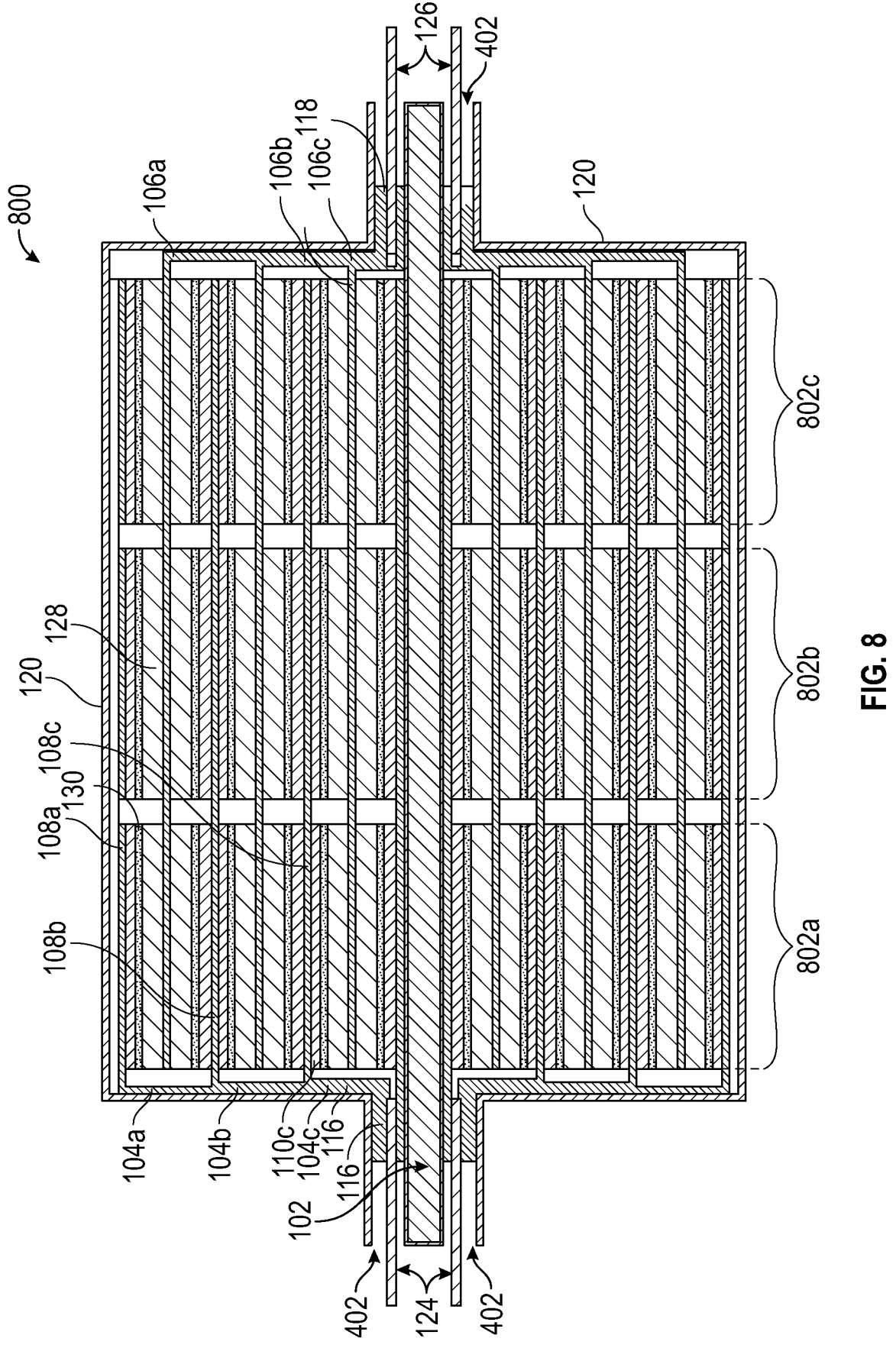
FIG. 8 illustrates a battery cell, according to some examples.

The battery cell 100 shown with reference to FIG. 1 can be a liquid lithium metal or lithium-ion system. In some examples, the battery cell can be a solid-state battery, as shown with reference to FIG. 8 and a battery cell 800. The battery cell 800 can include a plurality of electrode stacks 802a-802c each having the configuration, i.e., the anode 104 and the cathode 106, etc., as described above. The battery cell 800 can include all the features of the battery cell 100. Moreover, the discussion with regards to FIGS. 1 and 4-7 above are equally applicable to FIG. 8.

Figures 9, 10, 11, 12, 13:
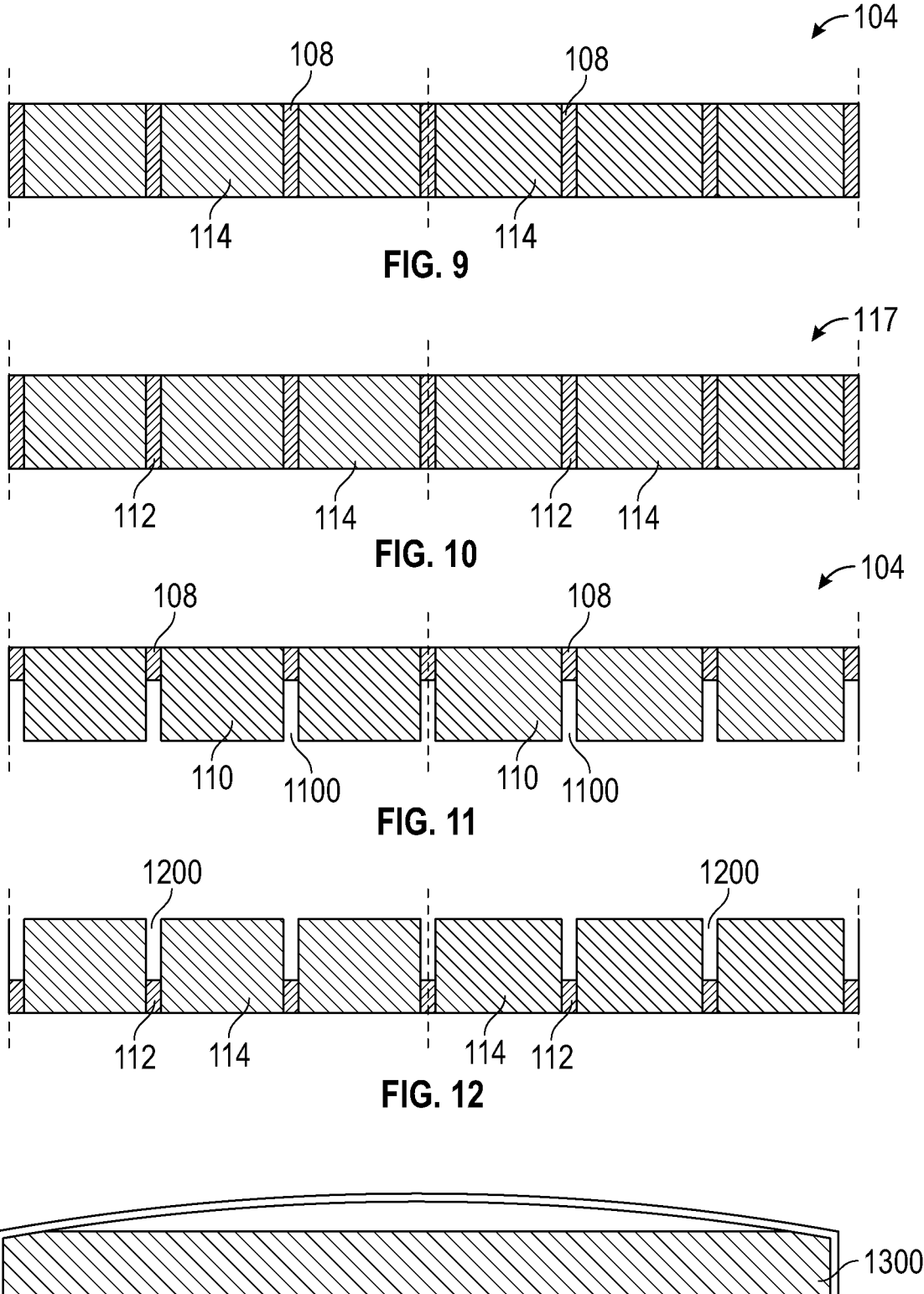
FIGS. 9 and 10 illustrate the formation of anodes and cathodes for the battery cell of FIG. 8, according to some examples.
FIGS. 11 and 12 illustrate the formation of anodes and cathodes for the battery cell of FIG. 8, according to some examples.
FIG. 13 illustrates a temperature control mechanism, according to alternative examples.

Each of the anodes 104 can include a single current collector 108 (generically shown as the current collecting portion 108 in FIG. 9) along with active areas 114 in FIG. 9), which can be formed as a coating on the current collecting portion 108 as detailed above and as more clearly shown with reference to FIG. 9. As can be seen with reference to FIG. 9, the anode 104 can include a single current collector 108 where a plurality of the active areas 114 can be formed on the current collecting portion 108 as described above.

In addition to the techniques described above, the active areas 114 can be formed by skip coating the material for the active area 114, such as graphite or a deposition of lithium, onto the current collector portion 108 on one or both sides.

In these examples, the active area 114 can have another layer, the solid-state electrolyte/separator, for features in the anode 104. Once the structure in FIG. 9 is formed and dried, the structure can be slit such that the appropriate number of collection portions 108 and active areas 114 can be obtained. Using the slit structure, stacking can occur to achieve the structure shown with reference to FIG. 8 and the battery cell 800.

Each of the cathodes 106 can include the current collector portion 112 along with the active area 117, which can be formed as a coating on the current collecting portion 112, as more clearly shown with reference to FIG. 10. As can be seen with reference to FIG. 10, similar to the anode 104, the cathodes a plurality of active material layers 117 can be coated onto the each current collecting portion 112 on one or both sides.

Additionally, the active area 117 can be formed of any type of cathode material that has high energy density, high power density, and a long cycle life. Furthermore, the active area 117 can be formed by skip coating the material for the active area 117 onto the current collector portion 112. Once the structure in FIG. 10 is formed and dried, the structure can be slit such that the appropriate number of collection portions 112 and active areas 117 can be obtained. Using the slit structure, stacking can occur to achieve the structure shown with reference to FIG. 8 and the battery cell 800. In addition, as may be seen with reference to FIG. 8, the temperature control mechanism 102 can be disposed between the stacks and centrally located within the battery cell 800.

In addition to using slitting and skip coating techniques to form the anodes 104 and cathodes 106, a punch through process can be used to form the anodes 104 and the cathodes 106, as shown with reference to FIGS. 11 and 12. After formation of the anodes 104 along with the active area 114 by costing the material for the active area 114 onto the current collecting portion 108 using the techniques discussed above, punch throughs 1100 can be formed in the anode 104. Once the punch throughs 1100 are formed, the current collecting portion 108 can be formed in the punch throughs 1100.

Regarding the cathodes 106, a similar process can be used. More specifically, the active area 117 can be formed by coating the material for the active area 117 onto the current collector portion 112. Afterwards, punch throughs 1200 can be formed in the cathode 106. Once the punch throughs 1200 are formed, the current collecting portion 112 can be formed in the punch throughs 1200. Using the anode in FIG. 11 with the cathode in FIG. 12 prevents the bare metallic current collectors 108 and 112 from coming into contact after stacking, thereby potentially shorting the cell.

In examples, the temperature control mechanism 102 can have any type of configuration. Now making reference to FIG. 13, a temperature control mechanism 1300 is shown. Here, the temperature control mechanism 1300 has a semi-ovoid configuration as opposed to a substantially planar configuration, as shown with reference to FIGS. 1-11. Moreover, the temperature control mechanism 1300 can have the same features as the temperature control mechanism 102 described above and in particular with reference to FIGS. 4-7. In addition, the discussion with regards to FIGS. 1-11 above are equally applicable to the temperature control mechanism 1300. The temperature control mechanism 1300 can be formed from a flexible material that can flex upon the application of a fluidic pressure. Examples of materials that can be used can include any type of polymer or elastomer that is capable of flexing.

The ovoid configuration of the temperature control mechanism 1300 allows the temperature control mechanism 1300 to apply a pressure within the battery cells 100 and 800. In examples, the flow pressure of the temperature control mechanism 1300 can be modulated in order to control a pressure applied within the battery cells 100 and 800. The flow pressure can relate to a heat transfer fluid used for heating and/or cooling. In addition, any other type of fluid can be used to modulate a pressure exerted by the temperature control mechanism 1300. Thus, in addition to modulating a temperature of the battery cells 100 and 800 as detailed above, the temperature control mechanism 1300 can have the added benefit of modulating a pressure within the battery cells 100 and 800 as discussed above.

Figure 14:
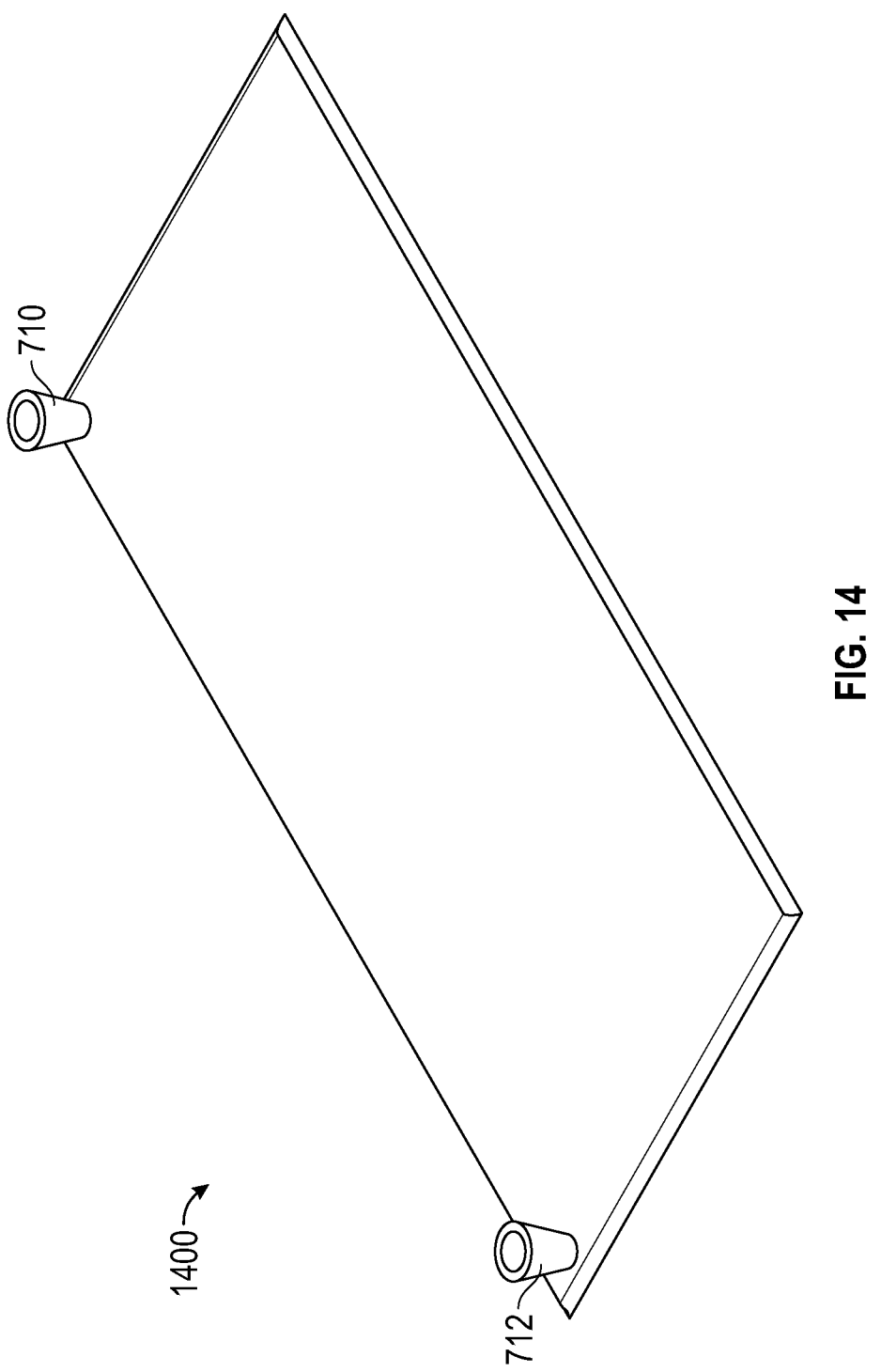
FIG. 14 illustrates a temperature control mechanism for the battery cell of FIG. 1, according to some examples.

Now making reference to FIG. 14, an alternative example of a temperature control mechanism 1400 is shown. Here, the temperature control mechanism 1400 includes the inlet 710 and the outlet 712.

Alternative examples implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the Figures and claims, modifications and changes can be made to the preferred embodiments of the invention without departing from the scope of this invention defined in the following claims.

The invention claimed is:

1. A battery cell comprising:
a plurality of anodes;
a plurality of cathodes;
a pouch laminate disposed over the plurality of anodes and the plurality of cathodes; and
a temperature control mechanism centrally located within the pouch laminate, wherein the temperature control mechanism:
is disposed between anodes of the plurality of anodes and cathodes of the plurality of cathodes such that the temperature control mechanism is centrally located within a battery cell;
is formed from a flexible material that flexes upon the application of a fluidic pressure;
includes passageways through which a heat transfer fluid travels; and is configured such that when the heat transfer fluid travels through the passageways, the temperature control mechanism is configured to expand and apply pressure on the battery cell.

2. The battery cell of claim 1, wherein the pouch laminate includes a sealant layer formed on an inside surface thereof and the temperature control mechanism has a co-polymer propylene and polyethylene (CPP) layer disposed on sides thereof.

3. The battery cell of claim 2, wherein the pouch laminate CPP layer is fused with the temperature control mechanism CPP layer thereby forming a hermetic seal.

4. The battery cell of claim 1, wherein temperature control mechanism has an ovoid configuration.

5. The battery cell of claim 1, wherein the temperature control mechanism includes a first hollow plate coupled with a second hollow plate, wherein a sealed hollow cavity is formed between the first hollow plate and the second hollow plate.

6. The battery cell of claim 5, wherein the temperature control mechanism includes an input port, an output port, and the passageways are fluidly coupled with the input port and the output port.

7. A battery cell comprising:
an anode having a single current collector and a plurality of active areas, wherein the plurality of anode active areas form first stacks;
a cathode having a single current collector and a plurality of active areas, wherein the plurality of cathode active areas form second stacks;
a solid-state electrolyte layer separating the anode and the cathode;
a pouch laminate disposed over the anode and the cathode; and
a temperature control mechanism centrally located within the pouch laminate, wherein the temperature control mechanism:
is disposed between the first and second stacks such that the temperature control mechanism is centrally located within battery cell;
is formed from a flexible material that flexes upon the application of a fluidic pressure;
includes passageways through which a heat transfer fluid travels; and
is configured such that when the heat transfer fluid travels through the passageways, the temperature control mechanism is configured to expand and apply pressure on the battery cell.

8. The battery cell of claim 7, wherein the pouch laminate includes a co-polymer propylene and polyethylene (CPP) layer formed on an inside surface thereof and the temperature control mechanism has a CPP layer disposed on sides thereof.

9. The battery cell of claim 8, wherein the pouch laminate CPP layer is fused with the temperature control mechanism CPP layer thereby forming a hermetic seal.

10. The battery cell of claim 7, wherein temperature control mechanism has an ovoid configuration.

11. The battery cell of claim 7, wherein the temperature control mechanism includes a first hollow plate coupled with a second hollow plate, wherein a sealed hollow cavity is formed between the first hollow plate and the second hollow plate.

12. The battery cell of claim 11, wherein the temperature control mechanism includes an input port, an output port, and the passageways are fluidly coupled with the input port and the output port.

13. A battery cell comprising:

a plurality of anodes;

a plurality of cathodes;

a solid-state electrolyte layer separating an anode of the plurality of anodes and a cathode of the plurality of cathodes;

a pouch laminate disposed over the plurality of anodes and the plurality of cathodes; and an ovoid temperature control mechanism centrally located within the pouch laminate, wherein the temperature control mechanism is disposed between anodes of the plurality of anodes and cathodes of the plurality of cathodes such that the temperature control mechanism; is centrally located within battery cell;

is formed from a flexible material that flexes upon the application of a fluidic pressure;

includes passageways through which a heat transfer fluid travels; and is configured such that when the heat transfer fluid travels through the passageways, the temperature control mechanism is configured to expand and apply pressure on the battery cell.

14. The battery cell of claim 13, wherein the pouch laminate includes a co-polymer propylene and polyethylene (CPP) layer formed on an inside surface thereof and the temperature control mechanism has a CPP layer disposed on sides thereof.

15. The battery cell of claim 14, wherein the pouch laminate CPP layer is fused with the temperature control mechanism CPP layer thereby forming a hermetic seal.

16. The battery cell of claim 13, the temperature control mechanism including:

a first hollow plate coupled with a second hollow plate, wherein a sealed hollow cavity is formed between the first hollow plate and the second hollow plate;

an input port;

an output port; and the passageways are fluidly coupled with the input port and the output port.

\* \* \* \* \*